United States Patent [19]

Hughes et al.

[11] 4,396,473

[45] Aug. 2, 1983

[54] CATHODE PREPARED BY ELECTRO ARC SPRAY METALLIZATION, ELECTRO ARC SPRAY METALLIZATION METHOD OF PREPARING A CATHODE, AND ELECTROLYSIS WITH A CATHODE PREPARED BY ELECTRO ARC SPRAY METALLIZATION

[75] Inventors: Gary N. Hughes, Pittsburgh, Pa.; Cletus N. Welch, Clinton, Ohio

[73] Assignee: PPG Industries, Inc., Pittsburgh, Pa.

[21] Appl. No.: 258,693

[22] Filed: Apr. 29, 1981

[51] Int. Cl.³ .................. C25B 1/34; C25B 1/04; C25B 1/06
[52] U.S. Cl. ................... 204/98; 204/128; 204/290 R; 204/37; 204/423
[58] Field of Search ............ 204/98, 128, 290 R; 427/37, 423

[56] References Cited

U.S. PATENT DOCUMENTS

| | | | |
|---|---|---|---|
| 3,436,248 | 4/1969 | Dittrich et al. | 427/423 |
| 3,546,415 | 12/1970 | Marantz | 219/137.71 |
| 3,637,437 | 1/1972 | Goldberger | 136/120 |
| 4,024,044 | 5/1977 | Brannan et al. | 204/242 |
| 4,027,367 | 6/1977 | Rondeau | 427/37 |
| 4,049,841 | 9/1977 | Coker et al. | 427/34 |
| 4,116,804 | 9/1978 | Needes | 204/290 R |
| 4,172,155 | 10/1979 | Pease | 427/37 |
| 4,230,750 | 10/1980 | Yurasko | 427/423 |

Primary Examiner—R. L. Andrews
Attorney, Agent, or Firm—Richard M. Goldman

[57] ABSTRACT

Discloses a cathode having a porous surface prepared by electro arc spray metallization of two wires of a leachable metal and a catalytic metal onto a substrate, and removal of the leachable metal. Also discloses method of preparing the cathode, and an electrolytic process using the cathode.

2 Claims, 4 Drawing Figures

CATHODE PREPARED BY ELECTRO ARC SPRAY METALLIZATION, ELECTRO ARC SPRAY METALLIZATION METHOD OF PREPARING A CATHODE, AND ELECTROLYSIS WITH A CATHODE PREPARED BY ELECTRO ARC SPRAY METALLIZATION

DESCRIPTION OF THE INVENTION

Alkali metal hydroxide and chlorine are commercially produced by electrolyzing an alkali metal chloride brine, for example an aqueous solution of sodium chloride or an aqueous solution of potassium chloride. The alkali metal chloride solution is fed into the anolyte compartment of an electrolytic cell, a voltage is imposed across the cell, chlorine is evolved at the anode, alkali metal hydroxide is evolved in the catholyte, and hydrogen is evolved at the cathode.

The overall anode reaction is:

$$Cl^- \rightarrow \tfrac{1}{2}Cl_2 + e^- \qquad (1)$$

while the overall cathode reaction is:

$$H_2O + e^- \rightarrow \tfrac{1}{2}H_2 + OH^- \qquad (2)$$

More precisely, the cathode reaction is reported to be:

$$H_2O + e^- \rightarrow H_{ads} + OH^- \qquad (3)$$

by which the monatomic hydrogen is adsorbed onto the surface of the cathode. In alkaline media, the adsorbed hydrogen is reported to be desorbed from the cathode surface according to one of two processes:

$$2H_{ads} \rightarrow H_2, \text{ or} \qquad (4)$$

$$H_{ads} + H_2O + 3^- \rightarrow H_2 + OH^- \qquad (5)$$

The hydrogen desorption step, that is, either reaction (4) or reaction (5) is reported to be the hydrogen overvoltage determining step. That is, it is the rate controlling step and its activation energy bears a relationship to the cathodic hydrogen overvoltage. The hydrogen evolution potential for the overall reaction (2) is on the order of about 1.5 to 1.6 volts measured against a saturated calomel electrode (SCE) on an iron cathode in alkaline media. Approximately 0.4 to 0.5 volt represents the hydrogen overvoltage on iron while 1.11 volt is the equilibrium decomposition voltage.

Iron, as used herein to characterize cathodes, includes elemental iron such as carbon steels, and alloys of iron with manganese, phosphorus, cobalt, nickel, molybdenum, chromium, vanadium, palladium, titanium, zirconium, niobium, tantalum, tungsten, carbon, and the like.

It has now been found that the hydrogen overvoltage may be reduced, for example, to from about 0.01 volt to about 1.10 volt by utilizing a cathode having a porous catalytic surface of about 35 to 80 percent porosity, and preferably 50 to 75 percent porosity, characterized by an X-ray diffraction pattern, and prepared by electro-arc spray metallization of a catalytic metal, i.e., a group VIII transition metal, and a leachable or sacrificial metal, e.g., aluminum or zinc, and the subsequent removal of the leachable or sacrificial metal.

According to a still further exemplification of this invention, it has been found that a particularly desirable electrolytic cell may be provided having an anode, a cathode, and a permionic membrane therebetween to separate the anolyte compartment from the catholyte compartment, wherein the cathode is characterized by a porous catalytic surface as described herein.

According to a still further exemplification of this invention, it is possible to electrolyze alkali metal halide brines by feeding the alkali metal halide brine to the anolyte compartment, evolving the halogen at the anode, and hydroxyl ion at the cathode, where the cathode is characterized by a porous catalytic surface as described above.

According to a still further exemplification of the method of this invention, a cathode is prepared having an electro-conductive substrate with a porous catalytic surface, prepared by electro-arc spray metallization of wires of catalytic materials and leachable, sacrificial materials on the electroconductive substrate.

As used herein, electro-arc spray metallization means the use of two wires to form an initial surface, coating, layer, or film on the electroconductive substrate, with an arc being formed between the two wires, and the molten material formed thereby being driven or propelled onto the electroconductive substrate, e.g., by a compressed gas, such as compressed air, compressed nitrogen, or helium, among others. In this way the electroconductive substrate is not part of the electrical circuit, and the use of carbonaceous fuels or hydrogen to melt the metals and form the spray is avoided.

According to this invention there is provided a porous, electrocatalytic coating, surface, layer or film that is adherent to the electroconductive substrate, resistant to thermal shock, and resistant to abrasion. Moreover, the electro-arc spray metallization may be utilized to provide a catalytic coating on fingered electrodes.

THE FIGURES

The following figures are illustrative of this invention.

DETAILED DESCRIPTION OF THE INVENTION

Figure 1:
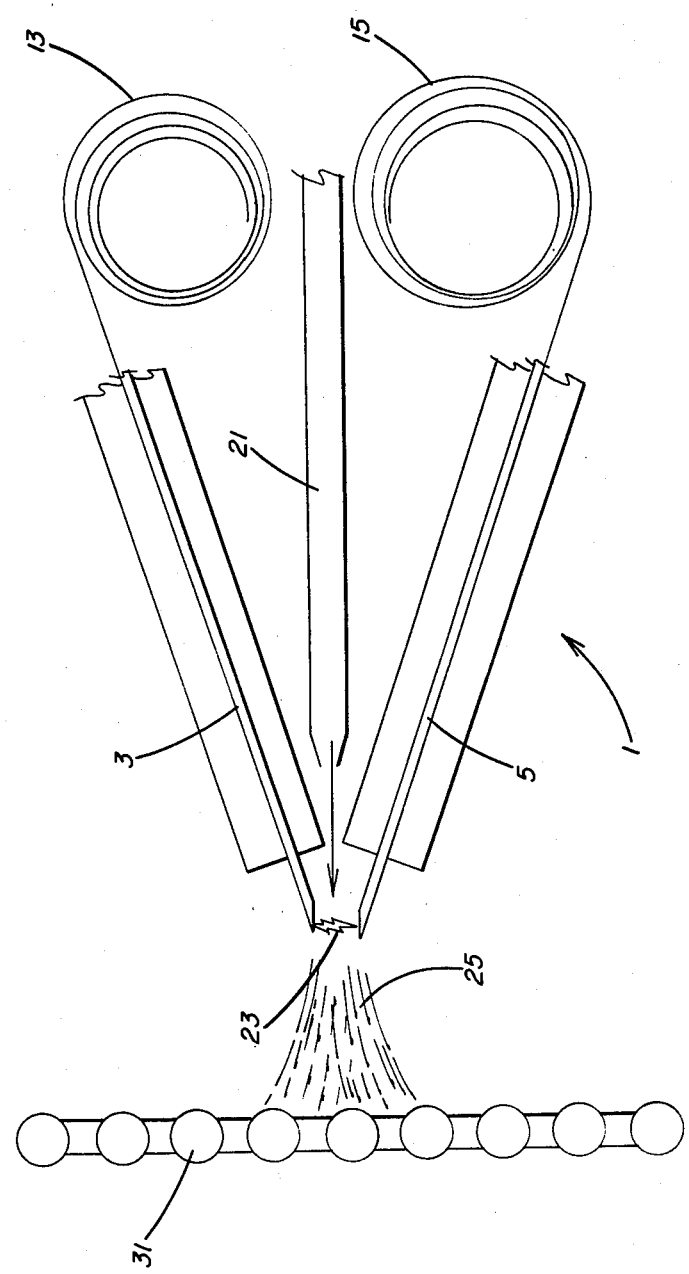
FIG. 1 is a schematic view of the method of this invention.

According to the invention herein contemplated an electrode is prepared having a high porosity nickel surface on a metallic substrate. According to a further exemplification of the invention herein contemplated a porous electrode surface is prepared by electro-arc wire metallizing a catalytic metal and a sacrificial metal onto a metallic substrate, and removing the sacrificial metal.

According to a still further exemplification of the invention herein contemplated, a porous electrode surface is prepared by electroarc wire metallizing wires of a catalytic metal clad with a sacrificial metal whereby to retain the ductility and malleability of the metals compared to the lower ductility and malleability of the alloys.

As used herein the catalytic metals are metals having a lower hydrogen overvoltage than the substrate. They are, typically, the metal skeleton that remains behind as a porous surface on the electrode. Catalytic metals include the Group VIII transition metals, i.e., iron, cobalt, nickel, ruthenium, rhodium, palladium, osmium, iridium, platinum, alloys thereof, and mixtures thereof. Especially preferred because of their catalytic activity are nickel, palladium, and platinum. Nickel is especially preferred because of its catalytic activity and low cost.

By sacrificial metals are meant those metals that can be removed from the metallized deposit while leaving behind the catalytic metal. Preferred are zinc and aluminum. Especially preferred is aluminum. Sacrificial metals are also referred to herein as leachable metals.

An especially preferred combination of catalytic metal and sacrificial metal is nickel and aluminum. Under the metallizing conditions herein contemplated, nickel and aluminum form alloys such as $NiAl_3$, $Ni_2Al_3$, and $NiAl$. The alloy systems, e.g., $NiAl_3$ and $Ni_2Al_3$; $Ni_2Al_3$ and $NiAl$; and $NiAl_3$, $Ni_2Al_3$ and $NiAl$ provide an easily activatable or leachable deposit, having high activity.

By an electro-arc wire metallized deposit is meant a deposit of catalytic metal and sacrificial metal prepared by electro-arc wire deposition.

As herein contemplated, an arc 23 is struck between a pair of advancing metal wires 3, 5. The arc 23 melts the wires 3, 5, thereby forming molten metal particles 25. The molten metal particles 25 are carried to the electrode substrate 31 by a jet 21 of compressed air, and solidify to form a metallic film, coating, layer, or surface on the electrode substrate 31.

The wires 3, 5 are carried forward and continuously fed to the arc 23. Typically, the wires 3, 5 are carried forward at a speed of from about 2 to about 10 inches per second by motor driven rollers. In this way an application rate of about 0.2 to about 3.0 pounds per minute is provided, although higher or lower application rates may be utilized. The spray can be moved laterally at a pitch between of from about 0.125 inch to about 1 inch whereby to deposit metals at a loading of from about $5 \times 10^{-2}$ pounds per square foot to about 0.5 pounds of total metal per square foot.

The wires are generally from about 0.035 inch to about 0.16 inch in diameter, i.e., from about 16 gauge B. and S. to about 5 gauge B. and S. As will be described more fully hereinbelow, the wires may be clad, e.g., with the catalytic metal as the inside, surrounded by a cladding of sacrificial metal.

The electric power is sufficient to melt both wires. It is generally from about 3 kilowatts to about 24 kilowatts, i.e., from about 20 volts and 150 Amperes to about 40 volts and 600 amperes. In this way an arc temperature is provided that is hot enough to melt both the sacrificial metal and the catalytic metal, and to maintain the metals, including alloys and intermetallic compositions thereof, molten under conditions such as to form alloys, intermetallic compounds, and intimate mixtures thereof on the electrode substrate 31. For nickel and aluminum the proper temperature is above about 2000 degrees Centigrade, and up to about 2700 or even 3000 degrees Centigrade.

The arc is generally spaced from about 0.125 inch to about 1.00 inch from the electrode substrate. In this way fingered electrodes as described in e.g., U.S. Pat. No. 3,968,021, may be coated, e.g., after fabrication, by inserting the metallizer 1 between the electrodes. The metallizer tips may be perpendicular to the electrode surface or at an angle with respect thereto.

The molten metal is carried from the arc to the electrode substrate by compressed air. The compressed air carries the molten metal as a fine spray. The compressed air is preferably at a pressure above about 35 pounds per square inch, with pressures of about 50 to 75 pounds per square inch being particularly preferred.

As herein contemplated, the two consumable wires 3, 5, e.g., wires of catalyst metal clad with sacrificial metal, are fed into the metallizer 1. Electrical current is transferred to the wires, e.g., through electrode tips, whereby to strike the arc 23. The arc 23 melts the wires 3, 5, forming molten metal particles 25, which are propelled onto the electrode substrate 31 by the jet of compressed air 21.

According to one exemplification, at least one electro arc wire, e.g., wire 3 or wire 5, contains catalytic metal and at least one electro arc wire, e.g., either wire 5 or wire 3, contains sacrificial metal. According to a preferred exemplification, at least one of electro arc wires 3, 5 contains both catalytic metal and sacrificial metal, unalloyed with each other. According to a particularly preferred exemplification, both of the electro arc wires 3, 5 contain both catalytic metal and sacrificial metal unalloyed with each other.

The catalytic metal and the sacrificial metal in the wires should be unalloyed because alloys of, e.g., nickel and aluminum, are friable, non-malleable, and non-ductile. Even sintered wires of nickel and aluminum powders are not readily spoolable. According to one exemplification, the catalytic metal and the sacrificial metal may be braided or intertwined wires, i.e., wires consisting essentially of sacrificial metal twisted, braided, or intertwined with wires consisting essentially of catalytic wire. According to an alternative exemplification, the catalytic metal and the sacrificial metal may be a clad wire. In this way ease of wire feed to the arc is enhanced.

The relative rates of catalytic metal to leachable or sacrificial metal should be such as to provide a surface of 35 to 80 percent porosity after deposition and leaching. This degree of porosity may be provided by a sacrificial metal content of about 30 to 80 percent by weight, basis total sacrificial metal and catalytic metal.

While the catalytic metal is characterized as being a Group VIII transition, i.e., iron, cobalt, nickel, ruthenium, rhodium, palladium, osmium, iridium, or platinum, and especially nickel, it is to be understood that other transition metals may be present therewith. The other transition metals may be present with the catalytic metal at a trace level without deleterious effect. Alternatively, the other transition metals may be present therewith at a level sufficient to modify, enhance, or stabilize the catalytic properties, or to retard poisoning of the catalytic properties. The transition, other than a Group VIII transition metal, present in the porous, catalytic surface, may be molybdenum, titanium, tantalum, tungsten, niobium, or zirconium.

The sacrificial metal, i.e., the leachable metal, is removed, whereby to yield a porous surface, film, coating or layer. The sacrificial metal may be removed by a strong acid or by a strong base. Preferably it is removed by a strong base. Suitable strong bases include aqueous sodium hydroxide, aqueous potassium hydroxide, and the like.

The leaching of the sacrificial metal is carried out by means well known in the art, i.e., by immersion of the cathode in the alkaline medium prior to cell assembly, by immersion of the cathode in alkaline media during diaphragm deposition, by immersion of the diaphragm in alkaline media after cell assembly and prior to commencing electrolysis, by contacting the cathode with alkaline electrolyte during electrolysis, or by a combination of any of the above steps.

The resulting porous surface, film, layer, or coating has a porosity of from about 35 to about 80 percent, and preferably from about 50 to about 75 percent.

As herein contemplated, the catalytic film, surface, or layer is adherent to the electroconductive substrate, from about 0.001 inch thick to about 0.05 inch thick, i.e., from about 0.025 millimeters thick to about 1.25 millimeters thick, and contains from about 10 grams of catalytic metal per square foot to about 115 grams of catalytic metal per square foot, i.e., from about 23 to about 227 grams of total catalytic and sacrificial metal per square foot.

The resulting porous surface, film, layer or coating may exhibit pyrophoric properties. That is, when exposed to air it may increase in temperature. Therefore, the activated cathode should be immersed in electrolyte, maintained under an inert gas, or coated with a protective film, i.e., a wax or polymeric film, when not in an electrolytic cell.

The substrate is electroconductive and may be permeable to the flow of electrolyte between elements thereof, but substantially impermeable to the flow of electrolyte into the individual elements thereof. That is, the substrate is permeable to the bulk flow of electrolyte through individual elements thereof such as between individual rods or wires or through perforations, but not to the flow of electrolyte into and through the individual elements thereof. The cathode substrate may be a perforated sheet, a perforated plate, metal mesh, expanded metal mesh, metal rods, or the like.

The substrate is typically an iron substrate. As used herein, iron includes elemental iron, iron alloys such as carbon steels, and alloys of iron with manganese, phosphorus, cobalt, nickel, chromium, molybdenum, vanadium, palladium, titanium, zirconium, niobium, tantalum, tungsten, carbon, and the like. However, the electroconductive substrate may also be an electroconductive metal such as aluminum, copper, lead, or the like, having a suitable alkali-resistant surface thereon. Alternatively, the substrate can be cobalt, nickel, molybdenum, tungsten, or other alkali resistant metal. According to one particularly preferred exemplification, the electroconductive substrate has a nickel surface thereon whereby to protect the substrate from attack by concentrated alkali metal hydroxide catholyte liquors.

The unleached surface, coating, layer or film, as metallized or electro arc deposited onto the electrode substrate, and the subsequent, leached, active, porous surface, coating, layer or film, may be characterized by their stoichiometry and X-ray diffraction pattern. For example, when the catalytic metal, i.e, the transition metal, is nickel, and the leachable metal, i.e., the sacrificial metal, is aluminum, the surface, as deposited, generally contains from about 37 to 67 weight percent aluminum, the balance consisting essentially of nickel. The resulting metallized surface has the nickel and aluminum present as Ni, $NiAl_3$, $Ni_2Al_3$, and NiAl. Preferably a major portion of the aluminum and nickel are present as NiAl, $NiAl_3$ and $Ni_2Al_3$. The presence of Ni, $NiAl_3$, $Ni_2Al_3$, and NiAl, if any, give rise to a unique family of X-ray diffraction patterns.

The observation of the X-ray diffraction pattern requires subjecting samples of powders of the surface coating, or even the coated electrode to X-rays from a copper target. This is accomplished as described in, e.g., Chapter 5 of Klug and Alexander, *X-Ray Diffraction Procedures*, John Wiley and Sons, Inc. New York (1954), at pages 235-318, especially pages 270-318; and in Newfield, *X-Ray Diffraction Methods*, John Wiley and Sons, Inc., New York (1966) at pages 177-207.

As described in these tests, X-rays have a wavelength of 1.5405 Angstrom units. The X-rays diffracted by the sample are particularly intense at certain angles, theta, resulting in peaks on diffractometer printouts or in lines on photographic diffraction patterns. The high intensity peaks are caused by the X-rays being reflected from parallel planes in the crystal and reinforcing each other.

The wavelength of the X-rays, the spacing of the planes in the crystal, and the angle, theta, are related by Bragg's Law:

$2d \sin \theta = n \lambda$, that is, $2d \sin (\text{theta}) = n (\text{lambda})$ where d is the distance between planes of the crystal, n is an integer; $\lambda$, lambda is the wavelength of the X-rays; and $\theta$, theta is the angle of incidence of the X-rays, as well as the angle of reflection of the X-rays.

The X-ray diffraction data is obtained from a diffractometer that is direct reading in two theta, wherein 180 minus two theta is the angle between the incident ray and the reflected ray.

Figure 2:
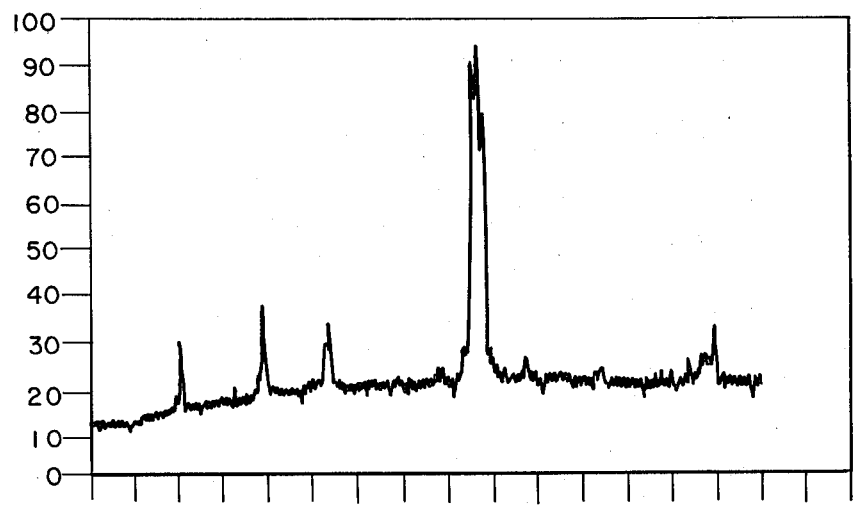
FIG. 2 is the X-ray diffraction pattern of the metallized, unleached electrode material of this invention, containing 41 weight percent aluminum, balance nickel.
Figure 3:
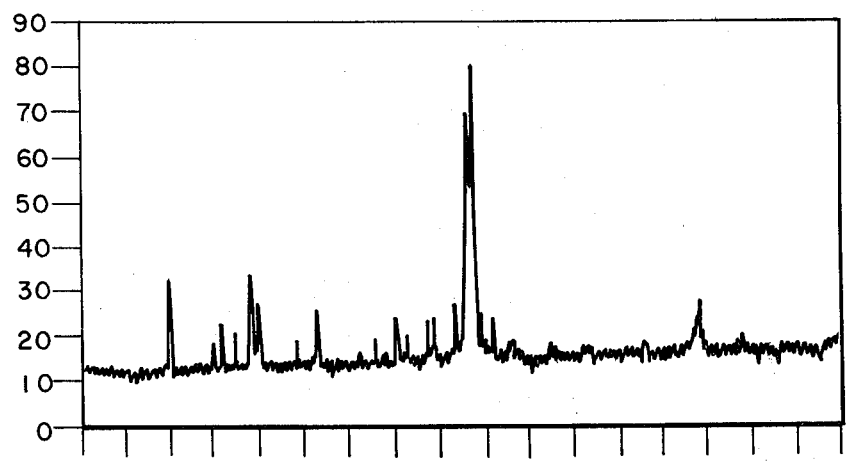
FIG. 3 is the X-ray diffraction pattern of an unleached, metallized electrode coating containing 53 weight percent aluminum, on an iron substrate.

The The unleached metallized deposit of nickel and aluminum is characterized by five X-ray diffraction peaks. The highest peak is at 44 to 46 degrees two theta. Other peaks, in approximate order of prominence, are at 25.4 to 26 degrees two theta, 18 to 18.4 degrees two theta, and 65 to 66 degrees two theta. These peaks may be seen in the 53 weight percent aluminum electroarc coating shown in FIG. 3, and in the 41 weight percent aluminum electro-arc coating shown in FIG. 2. To be noted is the greater number of components in the high aluminum content coating, FIG. 3. To be noted in both unleached deposits is the strong nickel peak at 44 to 46 degrees to theta. This shows the segregation of nickel and aluminum, brought about by the disparity in melting points of the nickel, the aluminum, and the alloys.

According to an exemplification of this invention, a 6 mesh to the inch by 6 mesh to the inch by 13 gauge steel screen is cleaned by sandblasting. A pair of aluminum clad nickel wires, each containing an 0.035 inch diameter nickel wire surrounded by an 0.018 to 0.019 inch thick aluminum cladding are fed to a METCO 2R MINIARC metallizer. A potential of 20 to 40 volts is established between the two wires, and a sixty pound per square inch jet of compressed air drives the molten particles 0.25 to 0.75 inches to the substrate. The wire speed is 2 to 10 inches per second per wire, with the electro arc sprayer moving 2 to 10 inches per second, at a pitch of 0.125 inch to 1 inch. In this way a coverage rate of about 0.05 to 1.1 pounds per square foot may be provided. A deposit of about 0.008 to 0.025 inch thick is provided on the cathode substrate. Thereafter the coated substrate is activated in a one normal aqueous sodium hydroxide for 2 to 5 hours to remove the aluminum. A perfluorocarbon carboxylic acid ester permionic is installed on the cathode, and the cathode-permionic membrane assembly is installed in an electrolytic cell. Electrolysis is commenced at a current density of 200-500 Amperes per square foot, and hydrogen is evolved at a hydrogen evolution overvoltage of 0.01 to 0.05 volt.

The following examples are illustrative of the method of this invention.

EXAMPLE I

A cathode was prepared by electro arc spraying nickel wire, clad with aluminum, onto a foraminous steel screen substrate. The cathode was then leached in aqueous sodium hydroxide. As asbestos diaphragm was applied to the leached cathode, and the cathode tested in a laboratory electrolytic cell.

A 6 mesh to the inch by 6 mesh to the inch by 0.095 inch wire diameter (13 gauge), 8 inch by 10 inch, steel screen was degreased and sandblasted. A nickel-aluminum coating was then electro arc sprayed onto one side of the steel screen substrate.

The electro arc sprayed surface was applied by feeding two aluminum clad, nickel wires to a 200 ampere, 50 volt METCO 2R MINIARC metallizer. Each wire was approximately 0.063 inch in diameter with an 0.035 inch diameter nickel wire core surrounded by an aluminum cladding approximately 0.014 inch thick.

A potential of 30 volts was imposed across the two wires, forming an arc and providing a current flow of 220 to 230 amperes. An air pressure of 65 pounds per square inch was applied at the arc. The spray angle was 90 degrees, and the spray distance was 0.75 inch, the wire speed was 4.6 inches per second and the electro arc sprayer was moved at 7.2 inches per second, providing a coverage rate of 0.32 pounds per square foot.

A portion of the coating material was removed for X-ray diffraction study. The powder sample had the X-ray diffraction pattern shown in FIG. 2, evidencing $Al_3Ni_2$, with the following peaks:

18.38 degrees two theta
23.10 degrees two theta
25.66 degrees two theta
31.24 degrees two theta
31.70 degrees two theta
41.26 degrees two theta
41.86 degrees two theta
47.20 degrees two theta
49.00 degress two theta
50.90 degrees two theta
51.50 degrees two theta
55.34 degrees two theta
56.08 degrees two theta
65.00 degrees two theta
65.90 degrees two theta The cathode was then etched in two normal aqueous sodium hydroxide at 24 degrees Centigrade for 3 hours. The surface appeared to be dark gray. A diaphragm was applied to the cathode by drawing a 2.09 weight percent slurry of mixed grades 3T and 4T chrysotile asbestos in an aqueous solution of about ten weight percent sodium hydroxide and fifteen weight percent sodium chloride through the cathode. The cathode-diaphragm unit was then installed in a laboratory electrolysis cell and electrolysis was commenced. Over a period of 175 days of electrolysis the cathode voltage was below 1.19 volts versus a saturated calomel reference electrode, and the hydrogen overvoltage was below 0.08 volt.

EXAMPLE II

Three cathodes were prepared by electro arc spraying nickel wire, clad with aluminum, onto foraminous steel screen substrates. The cathodes were then leached in aqueous sodium hydroxide. A resin reinforced asbestos diaphragm was applied to each leached cathode, and the cathodes were tested in a laboratory electrolytic cell.

Three 6 mesh to the inch by 6 mesh to the inch by 0.094 inch wire diameter, 8 inch by 10 inch, steel screens were degreased and sandblasted. A nickel-aluminum coating was then electro arc sprayed onto one side of each of the steel screen substrates. Electrodes D and E were 1 inch by 4 inch sections of the steel screen substrate.

The electro arc sprayed surface was applied by feeding two aluminum clad, nickel wires to a METCO 2R MINIARC metallizer. Each wire was approximately 0.075 inch in diameter with an 0.035 inch diameter nickel wire core surrounded by an aluminum cladding approximately 0.020 inch thick.

A potential of 30 volts was imposed across the two wires, forming an arc and providing a current flow of 220 to 230 amperes. An air pressure of 65 pounds per square inch was applied at the arc. The spray angle distance between lines of movement of the electro arc sprayer, and the spray distance are shown in Table I, below. The wire speed was 5.6 inches per second, and the electro arc sprayer was moved at 5 inches per second.

Each cathode was then etched in one normal aqueous sodium hydroxide at 24 degrees Centigrade for 3 hours. A diaphragm was applied to the cathode by drawing a 1.75 to 1.95 weight percent slurry of mixed grades 3T and 4T chrysotile asbestos in an aqueous solution of about ten weight percent sodium hydroxide and fifteen weight persent sodium chloride through the cathode. The cathode-diaphragm unit was then installed in a laboratory electrolysis cell and electrolysis was commenced. For electrodes A and B the slurry contained 10 weight percent Allied Chemical Corporation HALAR ® alternating poly(ethylene-chlorotrifluoroethylene), and the asbestos-diaphragm unit was heated to approximately 270 degrees for approximately 2 to 3 hours to melt the resin.

The period of electrolysis, cathode voltage, and hydrogen overvoltage are shown in Table I, below.

TABLE I

| ELECTRODE | SPRAY ANGLE (degrees) | SPRAY DISTANCE (inches) | DISTANCE BETWEEN TRACKS (inches) | PERIOD OF ELECTROLYSIS (days) | CATHODE VOLTAGE (volts) (versus SCE) | CATHODE OVER-VOLTAGE (volts) |
|---|---|---|---|---|---|---|
| A | 45° | 0.75 | 0.50 | 28 | 1.13 | 0.02 |
| B | 90° | 0.50 | 0.25 | 41 | 1.12 | 0.01 |
| C | 90° | 0.50 | 0.25 | 42 | 1.12 | 0.01 |
| D | 90° | 0.50 | 0.25 | 36 | 1.16 | 0.05 |
| E | 45° | 0.75 | 0.50 | 43 | 1.16 | 0.05 |

Figure 4:
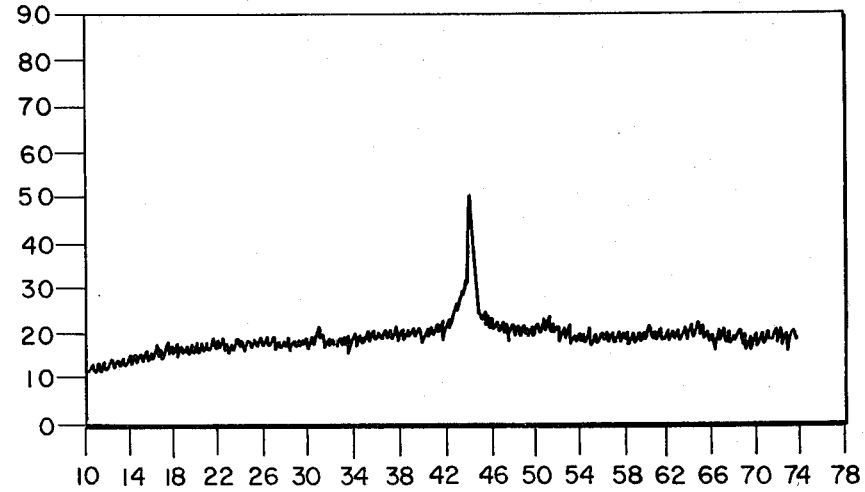
FIG. 4 is the X-ray diffraction pattern of the metallized electrode shown in FIG. 3, after leaching in 2 normal sodium hydroxide.

Electrode D was examined by X-ray diffraction before and after leaching in two normal aqueous sodium hydroxide. The unleached coating on the iron substrate had the X-ray diffraction pattern shown in FIG. 3, evidencing Al$_3$Ni$_2$, Al$_3$Ni, and the iron substrate, with the following peaks:

18.12 degrees two theta
22.00 degrees two theta
22.80 degrees two theta
24.12 degrees two theta
25.40 degrees two theta
25.90 degrees two theta
29.56 degrees two theta
31.30 degrees two theta
33.22 degrees two theta
35.10 degrees two theta
36.42 degrees two theta
37.28 degrees two theta
38.40 degrees two theta
39.17 degrees two theta
39.76 degrees two theta
41.16 degrees two theta
41.72 degrees two theta
43.58 degrees two theta
44.40 degrees two theta
44.82 degrees two theta
45.18 degrees two theta
46.00 degrees two theta
47.10 degrees two theta
48.34 degrees two theta
48.64 degrees two theta
49.50 degrees two theta
52.00 degrees two theta
55.40 degrees two theta
60.70 degrees two theta
62.82 degrees two theta
63.46 degrees two theta
65.10 degrees two theta
65.50 degrees two theta
68.40 degrees two theta
69.26 degrees two theta
71.20 degrees two theta
72.80 degrees two theta The leached coating on the iron substrate had the X-ray diffraction pattern shown in FIG. 4 evidencing nickel, and the iron substrate, with the following peaks:

31.20 degrees two theta
44.66 degrees two theta
57.04 degrees two theta
51.62 degrees two theta
53.20 degrees two theta
64.80 degrees two theta While the invention has been described in terms of specific details, exemplifications, and embodiments thereof, the description is not intended to limit the invention, the scope of which is as defined in the claims appended thereto.

We claim:

1. In a method of electrolyzing an aqueous chloride solution comprising passing an electrical current from an anode to a cathode and evolving chlorine at the anode and hydroxyl ion at the cathode, wherein the cathode comprises:
   a. a metallic substrate; and
   b. a porous nickel surface on said metallic substrate, said porous nickel surface having a porosity of from about 50 to about 75 percent,
the improvement wherein said porous nickel surface has an X-ray pattern having peaks at 31.20 degrees two theta, 44.66 degrees two theta, 51.62 degrees two theta, and 64.80 degrees two theta, and is prepared by the method comprising:
   (i) providing a pair of wires, said wires being spaced apart from one another, each of said wires comprising a nickel core and an aluminum cladding, said nickel and aluminum being substantially unalloyed with each other;
   (ii) establishing an electrical potential between the wires whereby to establish an arch therebetween at a temperature above about 2000° C. and melt a portion of each of said wires;
   (iii) depositing a molten material formed thereby on the metallic substrate, whereby to form a surface comprising from about 33 to 67 weight percent aluminum, balance nickel, in the form of Ni$_2$Al$_3$ and NiAl$_3$, and having an X-ray diffraction pattern with peaks at 43.58 to 46 degrees two theta, 25.4 to 26 degrees two theta, 18 to 18.4 degrees two theta, and 65 to 66 degrees two theta; and
   (iv) leaching aluminum therefrom to provide the porous nickel surface.

2. In an electrode comprising:
   a. a metallic substrate; and
   b. a porous nickel surface on said metallic substrate, said porous nickel surface having a porosity of from about 50 to about 75 percent,
the improvement wherein said porous nickel surface has an X-ray pattern having peaks at 31.20 degrees two theta, 44.66 degrees two theta, 51.62 degrees two theta, and 64.80 degrees two theta and is prepared by the method comprising:
   (i) providing a pair of wires, said wires being spaced apart from one another, each of said wires comprising a nickel core and an aluminum cladding, said nickel and aluminum being substantially unalloyed with each other;
   (ii) establishing an electrical potential between the wires whereby to establish an arc therebetween at a temperature above about 2000° C. and melt a portion of each of said wires;
   (iii) depositing molten material formed whereby on the metallic substrate whereby to form a surface comprising from about 33 to about 67 weight percent Al, balance Ni, in the form of NiAl$_3$ and Ni$_2$Al$_3$ and having an X-ray diffraction pattern with peaks at 43.58 to 46 degrees two theta, 25.4 to 26 degrees two theta, 18 to 18.4 degrees two theta, and 65 to 66 degrees two theta; and
   (iv) leaching aluminum therefrom to provide the porous nickel surface.

* * * * *

UNITED STATES PATENT AND TRADEMARK OFFICE
CERTIFICATE OF CORRECTION

PATENT NO. : 4,396,473

DATED : August 2, 1983

INVENTOR(S) : Gary N. Hughes and Cletus N. Welch

It is certified that error appears in the above-identified patent and that said Letters Patent is hereby corrected as shown below:

Claim 2 (iii), line 1, "whereby" should be --thereby--.

Signed and Sealed this

Twenty-seventh Day of September 1983

[SEAL]

Attest:

Attesting Officer

GERALD J. MOSSINGHOFF

Commissioner of Patents and Trademarks